No. 795,700. PATENTED JULY 25, 1905.
J. D. HEIDENREICH & R. E. FONTAINE.
BUTCHER'S MEAT SUPPORT.
APPLICATION FILED MAR. 7, 1904.
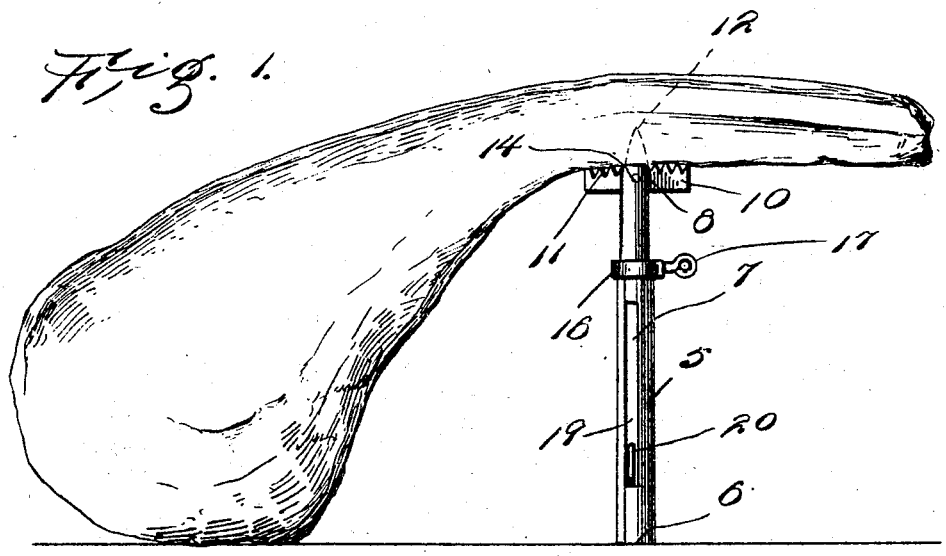
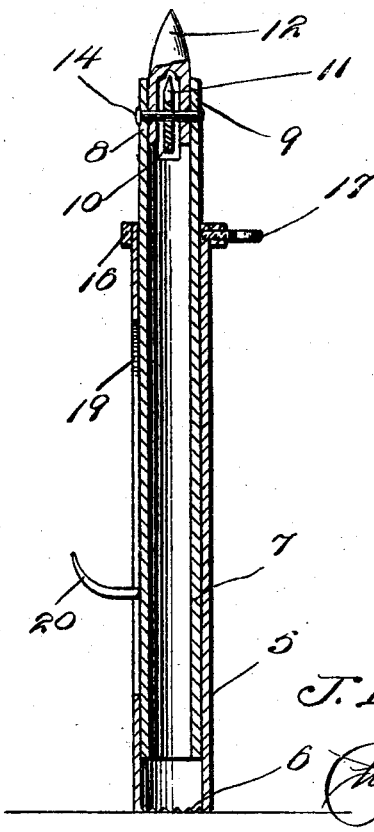

UNITED STATES PATENT OFFICE.

JOHN DAVID HEIDENREICH AND ROBERT ENZ FONTAINE, OF LAGRANDE, OREGON.

BUTCHER'S MEAT-SUPPORT.

No. 795,700.  Specification of Letters Patent.  Patented July 25, 1905

Application filed March 7, 1904. Serial No. 197,010.

*To all whom it may concern:*

Be it known that we, JOHN DAVID HEIDENREICH and ROBERT ENZ FONTAINE, citizens of the United States, residing at Lagrande, in the county of Union, State of Oregon, have invented certain new and useful Improvements in Butchers' Meat-Supports; and we do hereby declare the following to be a full, clear, and exact description of the invention, such as will enable others skilled in the art to which it appertains to make and use the same.

This invention relates to tools for butchers' use; and it has for its object to provide an adjustable support which may be employed for engaging and holding the ribs of a side of beef or other meat while the ribs are being cut and subsequently engage with another portion in the "chuck" to support the latter.

A further object of the invention is to provide a tool of this nature which may be easily and quickly adjusted to suit different specific conditions and which may be manufactured at a low cost.

In the drawings forming a portion of this specification, and in which like numerals of reference indicate similar parts in both views, Figure 1 is an elevation of the support, a side of meat with which it is engaged being shown in elevation. Fig. 2 is a longitudinal section of the support.

Referring now to the drawings, the present support comprises two telescoping members, one of which is in the form of a tube 5, having teeth 6 at its lower end to engage with the face of the butcher's block in the use of the tool and hold the support from slipping. The other telescoping member consists of a tube 7, slidable longitudinally in the tube 5 and the upper end of which is bifurcated to form spaced fingers 8 and 9, between which is passed a plate 10, the forward edge of which has forwardly-directed teeth 11. A spike 12 is disposed in the bifurcated end of the tube 7 and projects therefrom, the projecting portions being sharpened, as illustrated, while the portion that lies within the tube 7 is slotted to receive the toothed plate. The spike and the toothed plate are held in the end of the member 7 by a rivet 14, on which the toothed plate is pivotally movable.

Upon the upper end of the member 5 is fixed a collar 16, in which is engaged a thumbscrew 17, which passes through the member 5 and is adapted to impinge the member 7 to hold it against sliding movement in the member 5.

In the use of a tool for holding the meat while the ribs are being cut the member 5 is placed on end on the butcher's block, and the terminal spike and the teeth of the transverse pivoted plate are engaged in the meat, as illustrated in Fig. 1, the member 7 being adjusted in the member 5 to hold the ribs at their proper elevation. After the ribs have been cut it is desirable to hold the chuck. The member 5 is slotted longitudinally for a portion of its length, and the member 7 has a hook-finger 20, which projects through this slot, (shown at 19,) the bill of the hook being turned upwardly, so that it may be engaged with the meat to be supported. The adjustment of the member 7 in the member 5 serves also to adjust the height of the hook, as will be understood.

The present tool does away with the use of the pins usually employed, the objection to the pins being that they make holes in the block and also in the meat.

What is claimed is—

1. A meat-support comprising members adjustably connected, one of said members being provided with downwardly-directed teeth at its base, a spike at the opposite end of the second member and a plate pivoted in the second member at the base of the spike and movable in a plane longitudinally of the spike, said plate projecting at opposite sides of the member and having teeth extending in the same direction as the spike.

2. A meat-support comprising an extensible body portion having a spike at its upper end and a transverse plate pivoted at the base of the spike for movement in a plane longitudinally of the spike, said plate projecting at opposite sides of the support and having teeth extending in the same direction as the spike.

3. A meat-support comprising a longitudinally-slotted member, a second member slidably mounted in the tubular member and projecting therefrom, means for holding the members against sliding movement with respect to each other, a meat-engaging hook carried by the inner member and projecting outwardly through said slot and upwardly beyond the outer member, a spike at the outer end of the inner member, a plate pivoted in the inner member at the base of the spike for movement in a plane longitudinally of the inner member, said plate projecting at opposite sides of the support and having teeth extending in the same direction as the spike, the lower end of the outer member being serrated.

In testimony whereof we affix our signatures in presence of two witnesses.

JOHN DAVID HEIDENREICH.
ROBERT ENZ FONTAINE.

Witnesses:
H. T. WILLIAMS,
A. C. WILLIAMS.